(12) United States Patent
Yamamoto et al.

(10) Patent No.: US 8,470,476 B2
(45) Date of Patent: Jun. 25, 2013

(54) LITHIUM ION BATTERY

(75) Inventors: Taisuke Yamamoto, Nara (JP); Masaya Ugaji, Osaka (JP); Masahiro Kinoshita, Osaka (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 12/768,442

(22) Filed: Apr. 27, 2010

(65) Prior Publication Data
US 2010/0285368 A1 Nov. 11, 2010

(30) Foreign Application Priority Data

May 8, 2009 (JP) ................................. 2009-113749

(51) Int. Cl.
*H01M 4/58* (2010.01)

(52) U.S. Cl.
USPC ..................................................... 429/231.95

(58) Field of Classification Search
None
See application file for complete search history.

(56) References Cited

U.S. PATENT DOCUMENTS

| | | | |
|---|---|---|---|
| 6,746,803 B1 * | 6/2004 | Bauer et al. | 429/306 |
| 7,014,948 B2 * | 3/2006 | Lee et al. | 429/144 |
| 2005/0191556 A1 | 9/2005 | Kim et al. | |
| 2007/0059600 A1 | 3/2007 | Kim et al. | |
| 2007/0218365 A1 | 9/2007 | Takezawa et al. | |
| 2008/0020281 A1 * | 1/2008 | Kogetsu et al. | 429/231.5 |
| 2008/0213671 A1 | 9/2008 | Kogetsu et al. | |

FOREIGN PATENT DOCUMENTS

| | | |
|---|---|---|
| JP | 2005-197258 | 7/2005 |
| JP | 2007-080827 | 3/2007 |
| JP | 2007-280926 | 10/2007 |
| JP | 2008-218125 | 9/2008 |

* cited by examiner

*Primary Examiner* — Melvin C Mayes
*Assistant Examiner* — Douglas Call
(74) *Attorney, Agent, or Firm* — McDermott Will & Emery LLP

(57) ABSTRACT

A lithium ion battery includes: a positive electrode; a negative electrode that includes a negative electrode active material layer that contains an alloy-formable active material; an ion permeable insulating layer that is interposed between the positive electrode and the negative electrode; and an ion conductive polymer layer that is interposed between the negative electrode and the ion permeable insulating layer, in which the ion conductive polymer layer is configured to include a negative electrode-side portion and an ion permeable insulating layer-side portion that have different compositions, and the ion permeable insulating layer-side portion is configured to have higher ion conductivity than the negative electrode-side portion. With such a lithium ion battery, charge/discharge cycle characteristics and rate characteristics can be improved.

13 Claims, 5 Drawing Sheets

F I G. 5
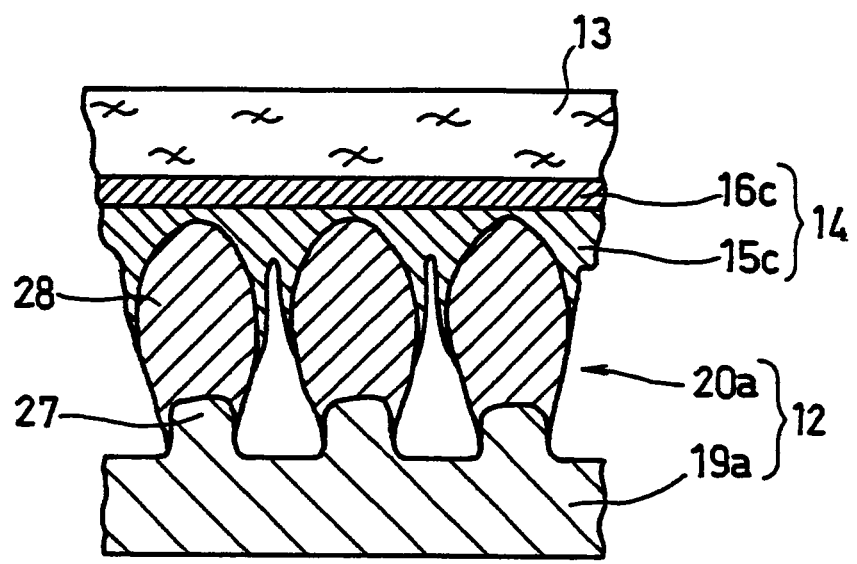

(a)

(b)

LITHIUM ION BATTERY

FIELD OF THE INVENTION

The present invention relates to a lithium ion battery, and more particularly to an improvement in the electrode group of a lithium ion battery that includes a negative electrode containing an alloy-formable active material.

BACKGROUND OF THE INVENTION

Lithium ion batteries have a high capacity and a high energy density, and can be easily made compact and lightweight. Accordingly, lithium ion batteries are widely used as a power source for compact portable electronic devices such as cellular phones, personal digital assistants (PDAs), notebook personal computers, digital cameras and portable game consoles. In addition, application development as a power source for vehicles, such as hybrid vehicles, and as an uninterruptible power supply is also in progress for lithium ion batteries.

Currently typical lithium ion batteries employ graphite as a negative electrode active material. On the other hand, attempts have been made in recent years to use active materials that are capable of absorbing and releasing lithium by alloying and dealloying (alloy-formable active materials) as a new negative electrode active material for achieving an even higher capacity. As preferred examples of such alloy-formable active materials, a substance simply composed of silicon or tin, and oxides and alloys containing silicon or tin are known.

However, alloy-formable active materials expand and contract significantly during absorption and release of lithium, and causes a relatively large amount of stress when expanded. Accordingly, the repetition of charge and discharge can cause cracking in the negative electrode active material layer containing an alloy-formable active material, and a new surface coming into contact with the electrolyte solution (hereinafter referred to as a "fresh surface") can easily appear inside the negative electrode active material layer. Such fresh surfaces can cause side reactions other than charge and discharge reactions due to contact with the electrolyte solution, producing by-products such as gas and a coating that covers the negative electrode active material layer. The gas and coating produced by such side reactions can cause deformation of the electrode and a reduction in the service or cycle life. Moreover, the electrolyte solution contained in the battery is consumed by the side reactions, causing a reduction in charge/discharge cycle characteristics.

Patent Document 1 discloses a negative electrode made of an alloy-formable active material in which the surface is covered with a polymer film. The polymer film is formed from a mixed solution of a crosslinking monomer, a polymer material and an organic solvent. The pores within the negative electrode active material layer are filled with a cross-linked form of the monomer that is capable of conducting ions but has a low ion conductivity level. The crosslinking monomer can be polyethylene glycol dimethacrylate or the like, and the polymer material can be polymethyl methacrylate or the like.

Patent Document 2 discloses a lithium battery including an alloy-formable negative electrode active material, a first binder coating layer that is formed on the surface of the negative electrode active material, a second binder coating layer that is formed on the surface of the first binder coating layer, and a current collector. The first binder coating layer is made of an elastic polymer binder such as styrene-butadiene rubber. The second binder coating layer is a layer for binding the negative electrode active material layer and the current collector, and is made of a cellulose (e.g., carboxymethyl cellulose), a polystyrene glycol, a poly(N-vinyl amide), a polyacrylamide, or the like.

Patent Document 1: Japanese Laid-Open Patent Publication No. 2005-197258
Patent Document 2: Japanese Laid-Open Patent Publication No. 2007-80827

BRIEF SUMMARY OF THE INVENTION

With regard to the negative electrode disclosed in Patent Document 1, the polymer film that covers the surface of the negative electrode active material layer is effective to some extent in suppressing the contact between the electrolyte solution and the fresh surface of the negative electrode active material layer. However, the polymer film has a low ion conductivity level, and is easily separated from the surface of the negative electrode active material layer due to the expansion and contraction of the alloy-formable active material.

With regard to the lithium battery disclosed in Patent Document 2, the elastic first binder coating layer can relieve the stress caused by the expansion of the negative electrode active material, and the second binder coating layer can increase the binding force between the negative electrode active material layer and the negative electrode current collector. However, the binders used for the first and second binder coating layers in the negative electrode of Patent Document 2 both have low ion conductivity levels, there is concern for lowering of rate characteristics.

From the viewpoint of suppressing side reactions caused by cracking of the alloy-formable active material to maintain charge/discharge cycle characteristics, it is preferable to form a polymer layer between the negative electrode active material layer and the ion permeable insulating layer (separator). However, in the case of forming such a polymer layer, it is necessary to suppress lowering of the rate characteristics of the battery.

The present invention provides a lithium ion battery that employs an alloy-formable active material but achieves superior charge/discharge cycle characteristics and superior rate characteristics.

A lithium ion battery according to the present invention includes: a positive electrode including a positive electrode current collector and a positive electrode active material layer that contains a positive electrode active material capable of absorbing and releasing lithium; a negative electrode including a negative electrode current collector and a negative electrode active material layer that contains an alloy-formable active material; an ion permeable insulating layer that is interposed between the positive electrode and the negative electrode; and an ion conductive polymer layer that is interposed between the negative electrode and the ion permeable insulating layer, wherein the ion conductive polymer layer includes a negative electrode-side portion and an ion permeable insulating layer-side portion that have different compositions, and the ion permeable insulating layer-side portion has higher ion conductivity than the negative electrode-side portion.

The lithium ion battery of the present invention employs an alloy-formable active material, and with the ion conductive polymer layer disposed between the negative electrode active material layer and the ion permeable insulating layer, it is possible to achieve superior charge/discharge cycle characteristics while achieving superior rate characteristics.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 5 is a partially enlarged vertical cross-sectional view showing a still another example of a modified version of FIG. 2.

DETAILED DESCRIPTION OF THE INVENTION

Figure 1:
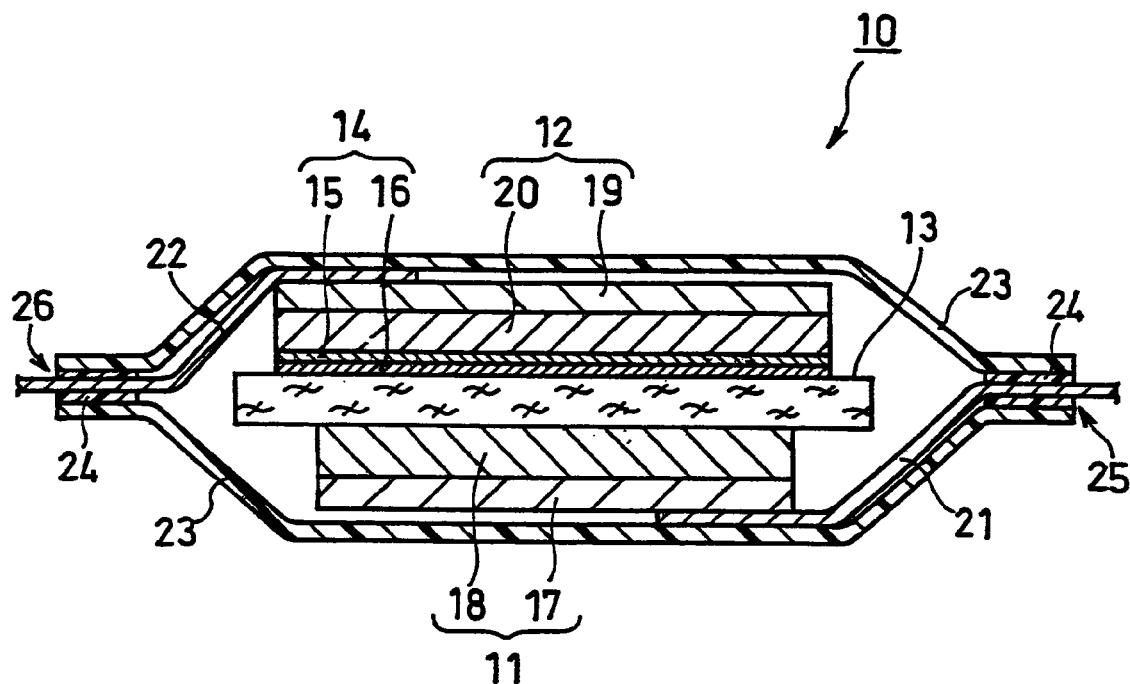
FIG. 1 is a vertical cross-sectional view schematically showing a lithium ion battery according to an embodiment of the present invention.

A lithium ion battery according to the present invention will be described with reference to an embodiment shown in FIG. 1. FIG. 1 is a vertical cross-sectional view schematically showing a configuration of a lithium ion battery according to an embodiment of the present invention.

A lithium ion battery 10 includes an electrode group including a positive electrode 11, a negative electrode 12, an ion permeable insulating layer 13 that is interposed between the positive electrode 11 and the negative electrode 12, and an ion conductive polymer layer 14 that is interposed between the negative electrode 12 and the ion permeable insulating layer 13. The ion conductive polymer layer 14 includes a first polymer layer 15 that is close to the negative electrode 12 and a second polymer layer 16 that is close to the ion permeable insulating layer 13.

The positive electrode 11 includes a positive electrode current collector 17 and a positive electrode active material layer 18 that is formed on the surface of the positive electrode current collector 17 and that contains a positive electrode active material capable of absorbing and releasing lithium.

The positive electrode current collector 17 can be any material commonly used in the field pertinent to the present invention, and, for example, a porous or nonporous conductive substrate can be used. Examples of the materials for the conductive substrate include metal materials such as stainless steel, titanium, aluminum and aluminum alloy, and various conductive resins.

Examples of porous conductive substrates include meshes, nets, punched sheets, lath structures, foams, non-woven fabric, and the like. Examples of the nonporous conductive substrates include foils, sheets, films, and the like.

The thickness of the conductive substrate can be set as appropriate according to the capacity and size of the lithium ion battery, the mechanical strength required for the positive electrode 11, and the like. Accordingly, the thickness is, but not particularly limited to, usually 1 to 500 µm, and preferably 1 to 50 µm, and more preferably 5 to 40 µm.

The positive electrode active material layer 18 is a layer that contains a positive electrode active material, and is formed on a surface of the positive electrode current collector 17. In the lithium ion battery 10 shown in FIG. 1, the positive electrode active material layer 18 is formed only on one surface of the positive electrode current collector 17, but may be formed on both surfaces. In addition, the positive electrode active material layer 18 may contain, in addition to a positive electrode active material, various additives such as a conductive material and a binder.

The positive electrode active material is a material capable of absorbing and releasing lithium ions. Specific examples include, but are not limited to, lithium-containing transition metal composite oxides, olivine-type lithium phosphate, and the like. The positive electrode active materials may be used singly or in combination of two or more.

A lithium-containing transition metal composite oxide is a metal oxide that contains lithium and a transition metal, or the metal oxide in which the transition metal is partially substituted by a different element. Examples of different elements include Na, Mg, Sc, Y, Mn, Fe, Co, Ni, Cu, Zn, Al, Cr, Pb, Sb, B, and the like. Among them, Mn, Al, Co, Ni and Mg are preferable. The different element can be one of the above-listed elements, or a combination of two or more.

Specific examples of lithium-containing composite oxides include, but are not limited to, compounds represented by the following composition formulas: $Li_kCoO_2$, $Li_kNiO_2$, $Li_kMnO_2$, $Li_kCo_mNi_{1-m}O_2$, $Li_kCo_mNi_{1-m}O_n$, $Li_kNi_{1-m}M_mO_n$, $Li_kMn_2O_4$, and $Li_kMn_{2-m}M_mO_4$. Among them, in particular, lithium-containing composite oxides represented by a composition formula: $Li_kCO_mM_{1-m}O_n$ are preferable.

In the above composition formulas, $0<k\leq1.2$, $0\leq m\leq0.9$, and $2.0<n\leq2.3$.

In the above composition formulas, M represents at least one element selected from the group consisting of Na, Mg, Sc, Y, Mn, Fe, Co, Ni, Cu, Zn, Al, Cr, Pb, Sb and B. The value of k representing the molar ratio of lithium is a value obtained immediately after the synthesis of the positive electrode active material, and the value of k fluctuates due to charge and discharge.

Specific examples of olivine-type lithium phosphate include $LiMPO_4$, $Li_2MPO_4F$, and the like. In the above composition formulas, M represents at least one element selected from the above-described group for M.

As the conductive material, any conductive material commonly used in the field pertinent to the present invention can be used. Examples include: graphites such as natural graphite and artificial graphite; carbon blacks such as acetylene black, ketjen black, channel black, furnace black, lamp black and thermal black; conductive fibers such as carbon fiber and metal fiber; metal powders such as aluminum powder; conductive whiskers such as zinc oxide and potassium titanate; conductive metal oxides such as titanium oxide; organic conductive materials such as phenylene derivatives; fluorinated carbons, and the like. The conductive materials can be used singly or in a combination of two or more.

As the binder, any binder commonly used in the field pertinent to the present invention can be used. Examples include: fluorine-containing polymers such as polyvinylidene fluoride (PVDF), polytetrafluoroethylene and polyhexafluoropropylene; polyolefins such as polyethylene and polypropylene; polyamide resins such as polyamide and aramid resin; polyimides; polyamide imides; vinyl cyanide polymers such as polyacrylonitrile; homo- or copolymers using an unsaturated fatty acid such as polyacrylic acid and polymethacrylic acid; homo- or copolymers using an unsaturated fatty acid ester such as polymethyl acrylate, polyethyl acrylate, polyhexyl acrylate, polymethyl methacrylate, polyethyl methacrylate and polyhexyl methacrylate (e.g., poly(meta) acrylic acid esters and so on); vinyl ester based polymers such as polyvinyl acetate; polyvinylpyrrolidone; polyethers (polyalkylene glycols such as polyoxyethylene, polyoxypropylene and oxyethylene-oxypropylene copolymers); polyethersulfone; rubbers such as styrene butadiene rubber and modified acrylic rubber; cellulose derivatives such as carboxymethyl cellulose; and so on.

The binder may be a copolymer of two kinds of monomers or more. Examples of monomers include: olefins such as ethylene and propylene; halogenated olefins such as tetrafluoroethylene, pentafluoropropylene, hexafluoropropylene and chlorotrifluoroethylene; vinyl ethers such as methyl vinyl ether; halogen atom-containing vinyl ethers such as fluoromethyl vinyl ether and perfluoroalkyl vinyl ether; vinylidene halides such as vinylidene fluoride; unsaturated fatty acids and esters thereof such as acrylic acid, methacrylic acid and methyl methacrylate; dienes such as butadiene and hexadiene; and so on.

The binders can be used singly or in a combination of two or more.

The positive electrode active material layer 18 can be formed by, for example, applying a positive electrode material mixture slurry onto the surface of the positive electrode current collector 17, drying and rolling the resultant layer together with the current collector. The positive electrode material mixture slurry can be prepared by dispersing a positive electrode active material, and optionally a conductive material, a binder and the like, in an appropriate liquid component.

The negative electrode 12 includes a negative electrode current collector 19 and a negative electrode active material layer 20 that is formed on the surface of the negative electrode current collector 19 and that contains an alloy-formable active material.

The negative electrode current collector 19 can be any material commonly used in the field pertinent to the present invention, and, for example, a porous or nonporous conductive substrate can be used. Examples of the materials for the conductive substrate include metal materials such as stainless steel, titanium, nickel, copper and copper alloy, various conductive resins, and the like. Examples of porous conductive substrates include meshes, nets, punched sheets, lath structures, porous sheets, foams, non-woven fabric, and the like. Examples of nonporous conductive substrates include foils, sheets, films, and the like. The thickness of the conductive substrate can be set as appropriate according to the capacity and size of the lithium ion battery, the mechanical strength required for the negative electrode 12, and the like. Accordingly, the thickness is, but not particularly limited to, usually 1 to 500 μm, preferably 1 to 100 μm, and more preferably 1 to 50 μm.

The negative electrode current collector 19 may be provided with irregularities on the surface thereof. As a method for providing irregularities on the surface, for example, a roughening process such as electrolytic plating, etching or blasting can be used.

The negative electrode active material layer 20 is a layer that contains an alloy-formable active material, and is formed on the surface of the negative electrode current collector 19. In the lithium ion battery 10 shown in FIG. 1, the negative electrode active material layer 20 is formed only on one surface of the negative electrode current collector 19, but may be formed on both surfaces. In addition, the negative electrode active material layer 20 may contain, in addition to an alloy-formable active material, various additives such as a conductive material and a binder. As the conductive material and the binder, any of the conductive materials and binders listed for the positive electrode active material layer 18 can be used. The negative electrode active material layer 20 may further contain a known negative electrode active material within a range that does not impair the characteristics thereof.

There is no particular limitation on the thickness of the negative electrode active material layer 20, but usually, the thickness can be selected from a range of about 1 to 200 μm. From the viewpoint of achieving a high capacity battery, the thickness is preferably 1 to 150 μm, and more preferably 5 to 100 μm (e.g., 5 to 50 μm).

In the case of the negative electrode active material layer being a thin film (thickness: about 1 to 100 μm) formed by a vapor deposition method, when fresh surfaces are created by repeated expansion and contraction of the negative electrode active material and the most part of the fresh surfaces is exposed at the surface of the negative electrode active material layer. However, the formation of an ion conductive polymer layer can suppress the contact between the fresh surfaces and the electrolyte solution effectively. In addition, by forming the negative electrode active material layer by a vapor deposition method, the surface of the negative electrode active material layer is roughened properly. Consequently, the adhesion properties between the negative electrode active material layer and the ion conductive polymer layer (e.g., the first polymer layer) can be improved even further.

The negative electrode active material layer 20 is preferably an amorphous or low crystalline thin film that contains an alloy-formable active material. Such a thin film can be formed by, for example, a vapor phase method as will be described later.

In the case of the negative electrode active material layer 20 being formed by a vapor phase method, it is preferable to provide irregularities in advance on the surface of the negative electrode current collector 19 by, for example, a roughening process, thereby improving the adhesion properties between the negative electrode current collector 19 and the negative electrode active material layer 20. In this case, the surface of the negative electrode active material layer 20 is roughened properly, and the adhesion properties between the negative electrode active material layer 20 and the ion conductive polymer layer 14, which will be described later, is improved.

The separation between the negative electrode active material layer 20 and the ion conductive polymer layer 14 is suppressed, whereby side reactions between the fresh surfaces and the non-aqueous electrolyte are suppressed, and thus, the deformation of the negative electrode 12, a reduction in the cycle life, the consumption of the electrolyte solution, and the like can be suppressed. Accordingly, it is possible to obtain a lithium ion battery that has superior charge/discharge cycle characteristics and a long useful cycle life while sufficiently taking advantage of the features of alloy-formable active material, such as providing a high capacity and high output.

Alloy-formable active materials (active materials capable of forming an alloy) are materials that absorb lithium by being alloyed with lithium during charge and desorb or release lithium by being dealloyed during discharge. As the negative electrode active material of the lithium ion battery 10, various types of alloy-formable active materials can be used, but in particular, silicon, a silicon-containing compound, tin, a tin-containing compound and the like are preferable. The alloy-formable active materials can be used singly or in a combination of two or more.

Examples of silicon-containing compounds include silicon oxides, silicon carbides, silicon nitrides, silicon-containing alloys, solid solutions thereof, and the like. Among them, silicon oxides are preferable.

Examples of silicon oxides include silicon oxides represented by a composition formula: $SiO_\alpha$ ($0.05<\alpha<1.95$), where $\alpha$ is preferably 0.1 to 1.8, and more preferably 0.15 to 1.6.

Examples of silicon carbides include silicon carbides represented by a composition formula: $SiC_\beta$ ($0<\beta<1$). Examples of silicon nitrides include silicon nitrides represented by a composition formula: $SiN_\gamma$ ($0<\gamma<4/3$), where $\beta$ is preferably 0.1 to 0.9, and $\gamma$ is preferably 0.1 to 1.2.

Examples of silicon-containing alloys include alloys made of silicon and an element other than silicon. Examples of elements other than silicon include Fe, Co, Sb, Bi, Pb, Ni, Cu, Zn, Ge, In, Sn, Ti, and the like. The elements other than silicon can be used singly or in a combination of two or more.

The silicon-containing compound may be one of the above-described silicon oxides, silicon carbides and silicon nitrides in which part of the silicon is substituted by one or more elements. Examples of elements that can substitute part of the silicon include B, Mg, Ni, Ti, Mo, Co, Ca, Cr, Cu, Fe, Mn, Nb, Ta, V, W, Zn, C, N, Sn, and the like.

Examples of tin-containing compounds include tin oxides, tin nitrides, tin-containing alloys, solid solutions thereof, and the like. Among them, tin oxides and tin-containing alloys are preferable.

Examples of tin oxides include tin oxides represented by a composition formula: $SnO_\delta$ ($0<\delta<2$). Examples of tin-containing alloys include Ni—Sn alloys, Mg—Sn alloys, Fe—Sn alloys, Cu—Sn alloys, Ti—Sn alloys, and the like. Other examples of tin-containing compounds include $SnSiO_3$, $Ni_2Sn_4$, $Mg_2Sn$, and the like.

The negative electrode active material layer 20 is formed on the surface of the negative electrode current collector 19 in the form of a thin film by, for example, a vapor phase method. Examples of vapor phase methods include vacuum vapor deposition method, sputtering method, ion plating method, laser abrasion method, chemical vapor deposition (CVD) method, plasma chemical vapor deposition method, spraying method, and the like. Among them, vacuum vapor deposition method is preferable.

In the present invention, at the time of the formation of the negative electrode active material layer 20 by a vapor phase method, it is preferable that irregularities or cracks are formed on at least part of the surface of the layer. This makes it possible to even further improve the adhesion properties between the negative electrode active material layer 20 and the ion conductive polymer layer 14, which will be described later. In addition, for example, partial separation of the ion conductive polymer layer 14 from the negative electrode active material layer 20 can be even further reduced. As a result, the characteristics of the lithium ion battery 10 such as charge/discharge cycle characteristics and output characteristics are maintained for a long period of time.

In the case of the negative electrode active material layer 20 having irregularities or cracks formed on the surface thereof, there is no particular limitation on the size of the recesses of the irregularities or the size of the cracks, but it is preferable that the length is 0.1 to 20 μm, the width is 0.1 to 5 μm, and the depth is 0.1 to 20 μm. By setting at least one of the length, width and depth within the above range, an anchoring effect can be exhibited, and the adhesion properties between the negative electrode active material layer 20 and the ion conductive polymer layer 14, which will be described later, can be further improved. This makes it possible to further effectively reduce the occurrence of cracking due to charge and discharge, as well as the creation of fresh surfaces.

Examples of the method for forming irregularities or cracks on the surface of the negative electrode active material layer 20 include a method in which a thin film made of an alloy-formable active material is stacked or deposited a plurality of times (hereinafter referred to as a "stacking method") and a method in which the surface roughness of the negative electrode current collector 19 is adjusted (hereinafter referred to as a "surface adjustment method").

The negative electrode active material layer 20 is not limited to the form of what is called a "solid film", and it may be, for example, an array of a plurality of columnar bodies that extend outward from the surface of the negative electrode current collector 19 and that are spaced apart from each other as will be described later. With the stacking method, it is possible to form such columnar bodies.

When a plurality of columnar bodies are formed on the surface, because a space is created between adjacent columnar bodies, the surface of the current collector has irregularities.

With the surface adjustment method, first, the surface roughness of the negative electrode current collector 19 is adjusted, and thereafter a negative electrode active material layer 20 is formed on the surface of the negative electrode current collector 19 by a vapor deposition method. Vapor deposition methods can form a thin film with an almost uniform thickness, so it is possible to cause the irregularities formed on the surface of the negative electrode current collector 19 to remain in the negative electrode active material layer 20. The surface roughness of the negative electrode current collector 19 can be adjusted by a known method, such as mechanical grinding, a chemical etching process, an electrochemical etching process, and polishing using an abrasive. It is also possible to adjust the surface roughness of the negative electrode current collector 19 by forming fine irregularities on the surface of the negative electrode current collector 19 by plating or the like.

An ion conductive polymer layer 14 such as a first polymer layer 15 which will be described later is formed on the surface of the negative electrode active material layer 20, but it is possible to add lithium to the negative electrode active material layer 20 in an amount corresponding to the irreversible capacity before such an ion conductive polymer layer 14 is formed. As used herein, "irreversible capacity" refers to the amount of lithium that is stored in the negative electrode active material layer 20 during the initial charge but is not released from the negative electrode active material layer 20. There is no limitation on the method for adding lithium, and methods including vacuum processes such as vapor deposition and sputtering, and electrochemical doping can be used.

The ion permeable insulating layer 13 is disposed between the positive electrode 11 and the ion conductive polymer layer 14. At least part of the negative electrode 12-side surface of the ion permeable insulating layer 13 is in contact with the surface of the ion conductive polymer layer 14 (specifically, the surface of the second polymer layer 16).

The ion permeable insulating layer 13 can be any ion permeable insulating layer commonly used in the field pertinent to the present invention. Specifically, ion permeable insulating layers generally used as separators can be used, and it is possible to select from various porous sheets and films including microporous films, woven fabric and non-woven fabric as appropriate considering the ion permeability, the mechanical strength and the insulation properties. They may be used singly or in a combination of two or more.

There is no particular limitation on the material of the ion permeable insulating layer 13, and various resin materials can be used. When considering the durability and the function of closing the through holes to prevent ions from passing therethrough in the event of overheating of the battery (shut-down function), it is preferable to use a polyolefin such as polyethylene or polypropylene as the material.

The thickness of the ion permeable insulating layer 13 is, but not particularly limited to, usually 1 to 50 μm, preferably 3 to 40 μm, and more preferably 5 to 30 μm.

There is no particular limitation on the porosity of the ion permeable insulating layer 13, or in other words, the percentage of the total pore volume to the total volume of the ion permeable insulating layer 13, but the porosity is preferably 30 to 70%, and more preferably 35 to 65% (e.g., 40 to 60%).

The ion permeable insulating layer 13 is impregnated with a lithium ion conductive non-aqueous electrolyte. Examples of non-aqueous electrolytes include a liquid non-aqueous electrolyte and a gel non-aqueous electrolyte.

A liquid non-aqueous electrolyte contains a solute (supporting salt), a non-aqueous solvent, and optionally various additives. The solute is usually dissolved in the non-aqueous solvent.

As the solute, any solute commonly used in the field pertinent to the present invention can be used. Examples include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiBnCl_{10}$, lithium lower aliphatic carboxylates, LiCl, LiBr, LiI, $LiBCl_4$, borates, imides, and the like. These solutes can be used singly or in a combination of two or more. The amount of solute dissolved in a non-aqueous solvent is preferably, but not limited to, 0.5 to 2 mol/L.

Examples of borates include lithium bis(1,2-benzenediolato(2-)—O,O')borate, lithium bis(2,3-naphthalenediolato(2-)—O,O')borate, lithium bis(2,2'-biphenyldiolato(2-)—O,O')borate, lithium bis(5-fluoro-2-olato-1-benzene sulfonato(2-)—O,O')borate, and the like. Examples of imides include lithium bis-trifluoromethanesulfonyl imide (($CF_3SO_2$)$_2$NLi), lithium trifluoromethane sulfonyl nonafluorobutane sulfonyl imide (($CF_3SO_2$) ($C_4F_9SO_2$)NLi), lithium bis-pentafluoroethane sulfonyl imide (($C_2F_5SO_2$)$_2$ NLi), and the like.

The non-aqueous solvent can be any non-aqueous solvent commonly used in the field pertinent to the present invention, and examples include cyclic carbonic acid esters, chain carbonic acid esters, cyclic carboxylic acid esters, and the like. Examples of cyclic carbonic acid esters include propylene carbonate, ethylene carbonate, and derivatives thereof. Examples of chain carbonic acid esters include diethyl carbonate, ethyl methyl carbonate and dimethyl carbonate. Examples of cyclic carboxylic acid esters include γ-butyrolactone and γ-valerolactone. The non-aqueous solvents can be used singly or in a combination of two or more.

Examples of additives include materials that improve charge/discharge efficiency and materials that inactivate the battery.

A material that improves charge/discharge efficiency can be, for example, decomposed on the negative electrode and forms a coating film that has high lithium ion conductivity, thereby improving charge/discharge efficiency. Examples of such materials include vinylene carbonate, 4-methylvinylene carbonate, 4,5-dimethylvinylene carbonate, 4-ethylvinylene carbonate, 4,5-diethyl vinylene carbonate, 4-propylvinylene carbonate, 4,5-dipropylvinylene carbonate, 4-phenyl vinylene carbonate, 4,5-diphenyl vinylene carbonate, vinyl ethylene carbonate, divinyl ethylene carbonate and fluorine substitutes thereof. They may be used singly or in a combination of two or more.

A material that inactivates the battery, for example, decomposes when the battery is overcharged and forms a coating film on the electrode surface, thereby inactivating the battery. Examples of such materials that inactivate the battery include benzene derivatives such as compounds that have a cyclic compound group in the benzene ring as a substituent. Examples of cyclic compound groups include aryl groups such as phenyl group; cyclic ether groups such as 1,4-dioxin-2-yl group; cyclic ester groups such as a lactyl group; cycloalkyl groups such as cyclohexyl group; allyloxy groups such as phenoxy group; and the like. Specific examples include cycloalkyl benzenes such as a cyclohexyl benzene, bisaryl such as biphenyl, and bisaryl ethers such as diphenyl ether. The benzene derivative can have these groups singly or in a combination of two or more.

The amount of benzene derivative contained in a liquid non-aqueous electrolyte is, for example, 10 parts by volume or less (e.g., 0.1 to 10 parts by volume), preferably 0.5 to 7 parts by volume, and more preferably 1 to 5 parts by volume with respect to 100 parts by weight of the non-aqueous solvent.

A gel non-aqueous electrolyte contains a liquid non-aqueous electrolyte and a polymer material capable of retaining the non-aqueous electrolyte. As such a polymer material, any material that is used as a polymer material for gel non-aqueous electrolytes for lithium ion batteries can be used, and specific examples include halogen-containing polymers (e.g., halogen-containing vinylidene polymers such as polyvinylidene fluoride, and halogen-containing polyolefins such as polyhexafluoropropylene); vinyl cyanide polymers such as polyacrylonitrile; polyalkylene oxide such as polyethylene oxide; and (meth)acrylic acid ester polymers such as polyacrylate.

In the lithium ion battery 10 shown in FIG. 1, as the ion permeable insulating layer 13, a separator impregnated with a non-aqueous electrolyte is used, but the ion permeable insulating layer 13 is not limited thereto, and may be a solid electrolyte layer.

The ion conductive polymer layer 14 is interposed between the negative electrode 12 and the ion permeable insulating layer 13. In the lithium ion battery 10 shown in FIG. 1, the ion conductive polymer layer 14 includes two polymer layers: a first polymer layer 15 that adheres to the negative electrode 12, and a second polymer layer 16 that is in contact with the ion permeable insulating layer 13. The first and second polymer layers have different compositions.

Of the two polymer layers forming an ion conductive polymer layer 14, the second polymer layer 16 is configured to have higher ion conductivity than that of the first polymer layer 15. On the other hand, the first polymer layer 15 is preferably configured to have higher adhesion properties to alloy-formable active material than the second polymer layer 16.

By configuring the first polymer layer 15 to have high adhesion properties to alloy-formable active material, even if a crack occurs in the negative electrode active material layer 20 due to repeated expansion and contraction of the alloy-formable active material, it is possible to suppress the separation of the ion conductive polymer layer 14 from the alloy-formable active material. This makes it possible to suppress the contact between fresh surfaces created in the negative electrode active material layer 20 and the electrolyte solution, as well as side reactions caused by such contact.

On the other hand, according to the investigations of the present inventors, when a polymer layer has high adhesion properties to alloy-formable active material, the ion conductivity tends to be low. Accordingly, if emphasis is placed only on the adhesion properties to alloy-formable active material in the ion conductive polymer layer 14 as a whole, the ion conductivity of the ion conductive polymer layer 14 might be lowered.

However, according to the above configuration, the second polymer layer 16, which is not in direct contact with the negative electrode active material, of the ion conductive polymer layer 14 has higher ion conductivity than the first polymer layer. Accordingly, it is possible to suppress the lowering of the ion conductivity of the ion conductive polymer layer 14 as a whole, as well as to achieve adhesion properties to negative electrode active material layer while achieving ion conductivity. It is also possible to suppress the lowering of ion conductivity between the negative electrode 12 and the ion permeable insulating layer 13, and thus, the rate characteristics of the lithium ion battery 10 can be maintained.

Accordingly, with the above configuration, it is possible to suppress deformation of the electrode, a reduction in the cycle life, and the consumption of electrolyte solution, and the like, and to improve the charge/discharge cycle characteristics of the lithium ion battery 10. Further, the resistance of the ion conductive polymer layer 14 can be lowered, thereby improving the output characteristics.

Where appropriate, one or more ion conductive polymer layers may be interposed between the first polymer layer 15 and the second polymer layer 16.

The ion conductivity of the first polymer layer 15 and the second polymer layer 16 can be suitably set so that practically sufficient levels of adhesion properties to negative electrode active material layer and ion conductivity can be secured in the ion conductive polymer layer 14 as a whole.

As the polymer that forms the ion conductive polymer layer 14, any polymer used for polymer electrolytes for lithium ion batteries can be used, and specific examples include: halogen-containing resins such as fluorocarbon resin or fluoro resin; polyalkylene oxides such as polyethylene oxide; acrylic polymers such as polyacrylonitrile and polyacrylate; derivatives thereof; copolymers thereof; and other materials that are used as polymer electrolytes.

As the fluorocarbon resin, resins that contain a fluorine atom-containing monomer, for example, fluorine atom-containing olefins such as vinylidene fluoride (VdF), hexafluoropropylene (HFP) and tetrafluoroethylene (TFE), or a derivative thereof as a constituent unit can be used. Specific examples include: homopolymers such as polyvinylidene fluoride (PVdF), polyhexafluoropropylene (PHFP) and polytetrafluoroethylene (PTFE); binary copolymers and ternary copolymer such as a copolymer of VdF and HFP (hereinafter this copolymer may be referred to as "P(VdF-HFP)"). The copolymers may be copolymers of fluorine atom-containing monomers or copolymers of a fluorine atom-containing monomer and other copolymerizable monomers.

For the ion conductive polymer layer 14, polymers listed above may be used singly or in a combination of two or more. In addition, from the viewpoint of enhancing voltage endurance properties and chemical stability of the ion conductive polymer layer 14, it is preferable that the ion conductive polymer layer 14 contains VdF, HFP or TFE as a constituent unit of the polymer.

In the configuration shown in FIG. 1, the ion conductive polymer layer 14 is a laminate of a first polymer layer 15 and a second polymer layer 16. The first polymer layer 15 is configured to have higher adhesion properties to alloy-formable active material than the second polymer layer 16, and the second polymer layer 16 is configured to have higher ion conductivity than the first polymer layer 15.

It is preferable that the first polymer layer 15 and the second polymer layer 16 both contain at least either one of PVDF and P(VdF-HFP). In this case, the first polymer layer 15 (e.g., the P(VdF-HFP) contained the first polymer layer 15) preferably has a lower content of HFP (monomer unit) than the second polymer layer 16 (e.g., the P(VdF-HFP) contained in the second polymer layer).

When the HFP content in the polymer layer (e.g., the HFP content of P(VdF-HFP)) is increased, because the affinity for electrolyte solution increases, the ion conductivity increases. Conversely, when the HFP content in the polymer layer (e.g., the HFP content of P(VdF-HFP)) is reduced, although the ion conductivity decreases, the affinity for electrolyte solution also decreases, and the amount of impregnated electrolyte solution in the polymer layer decreases as the affinity for electrolyte solutions decreases. Accordingly, it is possible for the polymer layer to suppress the lowering of the adhesion properties to alloy-formable active material after impregnation with an electrolyte solution and secure sufficient adhesion properties to alloy-formable active material.

For this reason, by configuring the ion conductive polymer layer 14 as described above and setting the HFP content in the polymer layers 15 and 16 (in P(VdF-HFP) forming the polymer layers) as described above, the adhesion properties of the first polymer layer 15 to alloy-formable active material and the ion conductivity level of the second polymer layer 16 can be easily adjusted.

In the case where the first polymer layer 15 and the second polymer layer 16 both contain P(VdF-HFP) even in a small amount, it is possible to improve the adhesion properties between the first polymer layer 15 and the second polymer layer 16.

In the case where one or more ion conductive polymer layers are interposed between the first polymer layer 15 and the second polymer layer 16, the adhesion properties to alloy-formable active material and the ion conductivity level are properly adjusted for each layer in the same manner described above.

The proportion of HFP(HFP units) contained in P(VdF-HFP) forming the first polymer layer 15 can be selected from a range of 0 to 20 wt % based on monomer weight, preferably 0.1 to 15 wt %, more preferably 0.5 to 15 wt %, and particularly 1 to 10 wt %. Setting the HFP content within the above range in P(VdF-HFP) forming the first polymer layer 15 is advantageous in that the adhesion properties to alloy-formable active material can be improved while maintaining the ion conductivity of the first polymer layer 15 (consequently, the ion conductive polymer layer 14).

The proportion of HFP(HFP units) contained in P(VdF-HFP) forming the second polymer layer 16 can be selected from, but not limited to, a range of about 1 to 40 wt % based on monomer weight, preferably 2 to 30 wt %, more preferably 4 to 30 wt %, and particularly 5 to 20 wt %. Setting the HFP content within the above range in P(VdF-HFP) forming the second polymer layer 16 is advantageous in that the ion conductivity of the second polymer layer 16 can be improved while maintaining the adhesion properties to the first polymer layer 15.

By reducing the HFP unit content in the first polymer layer to a level lower than that of the second polymer layer, the adhesion properties to the alloy-formable active material can be increased. In addition, because the HFP content of the second polymer layer becomes relatively large as compared to that of the first polymer layer, the ion conductivity can be relatively increased.

In the case where the HFP content in P(VdF-HFP) contained in the first polymer layer 15 is reduced to a level lower than that of the second polymer layer 16, the difference $R_I - R_N$ between the HFP content $R_I$ in P(VdF-HFP) constituting the second polymer layer 16 and the HFP content $R_N$ in P(VdF-HFP) constituting the first polymer layer 15 is, for example, 0.1 to 25 wt %, preferably 1 to 25 wt %, and more preferably 2 to 20 wt % (e.g., 5 to 18 wt %). By making such a difference that falls within the above range in HFP content between the first polymer layer 15 and the second polymer layer 16, the adhesion properties to alloy-formable active material and the ion conductivity of the ion conductive polymer layer 14 as a whole can be adjusted to achieve a good balance.

With the above configuration, in the first polymer layer of the ion conductive polymer layer, the contact between fresh surfaces created in the negative electrode active material layer and the electrolyte solution as well as side reactions caused by such contact can be even more highly suppressed, and the effect of improving the charge/discharge cycle characteristics of the battery can be further enhanced. In addition, the second polymer layer, which is on the insulating layer side, of the ion conductive polymer layer can be configured to have high ion conductivity, so the rate characteristics of the battery can be improved.

The material of the ion conductive polymer layer 14 is not limited to the polymer electrolytes listed above. The ion conductive polymer layer 14 may be obtained, for example, by impregnating a polymer such as an acrylic polymer (e.g., polyacrylonitrile or polyacrylate) or a polyalkylene oxide (e.g., polyethylene oxide or polypropylene oxide) with a supporting salt, so as to impart ion conductivity thereto.

The supporting salt can be a salt containing or producing lithium ions. Specifically, any supporting salt commonly used in the field pertinent to the present invention can be used, and examples include $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_nCl_{10}$, lithium lower aliphatic carboxylates, $LiCl$, $LiBr$, $LiI$, $LiBCl_4$, borates, imides, and the like. Examples of borates and imides include those listed for the solute. The supporting salt can be used singly or in a combination of two or more.

There is no particular limitation on the thickness of the ion conductive polymer layer 14, but the thickness is preferably 0.01 to 20 μm, and more preferably 0.05 to 10 μm (e.g., 0.1 to 5 μm). When the thickness falls within this range, even if cracking occurs in the negative electrode active material, the contact between fresh surfaces created in the negative electrode active material layer and the electrolyte solution as well as side reactions caused by such contact can be more effectively suppressed. In addition, the increase of the resistance against ionic conduction between the negative electrode and the ion permeable insulating layer can be suppressed, and the rate characteristics of the battery can be more effectively maintained.

When the thickness of the ion conductive polymer layer 14 is too small, the effect of suppressing the contact between fresh surfaces created in the negative electrode active material layer 20 by cracking and the non-aqueous electrolyte may not be exhibited sufficiently. Conversely, when the thickness of the ion conductive polymer layer 14 is too large, the ion conductivity between the negative electrode active material layer 20 and the ion permeable insulating layer 13 is lowered, and the output characteristics, charge/discharge cycle characteristics and storage characteristics of the lithium ion battery 10 may be lowered.

The ratio $T_N/T_I$ of the thickness $T_N$ of the first polymer layer 15 to the thickness $T_I$ of the second polymer layer 16 can be set as appropriate according to the ion conductivity of the first polymer layer 15 and the second polymer layer 16, and the adhesion properties of the first polymer layer 15 to alloy-formable active material. The ratio is preferably, but not specifically limited to, 0.01 to 10, and more preferably 0.05 to 5 (e.g., 0.1 to 3).

The ion conductive polymer layer can be formed by, for example, applying a polymer solution (or a dispersion, hereinafter sometimes referred to simply as a "polymer solution") containing a polymer listed above (or a mixture of a polymer listed above and a supporting salt listed above) onto the surface of the negative electrode active material layer and drying it (removing the solvent contained in the solution).

The first and second polymer layers 15 and 16 can be formed by, for example, applying a polymer solution (or dispersion) containing a polymer for forming a first polymer layer (or a mixture of a polymer listed above and a supporting salt listed above) onto the surface of the negative electrode active material layer 20 and drying it (removing the solvent), and then, applying a polymer solution (or dispersion) containing a polymer for forming a second polymer layer (or a mixture of a polymer listed above and a supporting salt listed above) onto the surface of the formed first polymer layer 15 and drying it (removing the solvent).

In the case where one or more ion conductive polymer layers are interposed between the polymer layer 15 and the polymer layer 16, in the same manner as these two layers are formed, a polymer solution or dispersion for forming each layer that faults the ion conductive polymer layer 14 is sequentially applied and dried according to the order of lamination of each layer.

The polymer solution (or dispersion) for forming an ion conductive polymer layer 14 can be prepared by, for example, dissolving or dispersing a polymer listed above (or a mixture of a polymer listed above and a supporting salt listed above) in an appropriate solvent. Examples of solvents include: amides such as dimethylformamide, dimethylacetamide and methylformamide; pyrrolidones such as N-methyl-2-pyrrolidone; amines such as dimethylamine; ketones such as acetone and cyclohexanone; esters (carbonic acid esters and so on) such as dimethyl carbonate and diethyl carbonate; and the like.

The ion conductive polymer layer 14 exhibits ion conductivity by coming into contact with the electrolyte solution after the battery has been assembled. In the case where a non-aqueous electrolyte solution or non-aqueous electrolyte is incorporated in the above polymer solution, ion conductivity can be imparted in advance at the time of the formation of the ion conductive polymer layer 14.

The polymer content in a polymer solution can be selected from a range of about 0.1 to 20 wt %, and the polymer content is preferably 0.5 to 15 wt %, and more preferably 1 to 10 wt % with respect to the total amount of the polymer solution. When the polymer content is within the above range, for example, in the case where irregularities or cracks are formed in advance on the surface of the negative electrode active material layer 20, it is possible to cause the polymer solution to more effectively permeate into the irregularities or cracks. Accordingly, the anchoring effect by the polymer that has permeated into the irregularities or cracks can be allowed to exhibit, and the adhesion properties between the negative electrode active material layer 20 and the ion conductive polymer layer 14 (the first polymer layer 15) can be even further improved.

The application of a polymer solution onto the surface of the negative electrode active material layer 20 can be achieved by a known method. Specific examples include application by screen printing, and application using a coating apparatus such as a die coater, roll coater, bar coater, gravure coater, spray coater or air knife coater.

After the ion conductive polymer layer 14 has been formed on the surface of the negative electrode active material layer 20, or after an electrode group including the positive electrode 11, the negative electrode 12, the ion permeable insulating layer 13 and the ion conductive polymer layer 14 has been formed, a heat pressing process may be performed on the negative electrode active material layer 20.

In the case of the former, heat pressing of the negative electrode active material layer 20 can be achieved by, for example, heat pressing a laminate including the negative electrode current collector 19, the negative electrode active material layer 20 and the ion conductive polymer layer 14 from both sides: the negative electrode current collector 19-side and the ion conductive polymer layer 14-side. In the case of the latter, heat pressing of the negative electrode active material layer 20 can be achieved by, for example, heat pressing a laminate (electrode group) in which the negative electrode 12, the ion conductive polymer layer 14, the ion permeable insulating layer 13 and the positive electrode 11 are laminated in this order from the negative electrode current collector 19-side of the negative electrode 12 and the positive electrode current collector 17-side of the positive electrode 11.

By heat pressing the negative electrode active material layer 20, the adhesion properties between the alloy-formable active material and the ion conductive polymer layer 14, as well as the adhesion properties between the ion conductive polymer layer 14 and the ion permeable insulating layer 13 can be further improved.

In the above-described lithium ion battery, the ion conductive polymer layer 14 may contain an inorganic filler. The inclusion of an inorganic filler can improve the heat resistance of the ion conductive polymer layer (e.g., the first polymer layer). Thereby, the reliability of the battery can be improved while securing the cycle characteristics and rate characteristics.

The lithium ion battery 10 shown in FIG. 1 is a flat or envelope-shaped battery obtained by housing an electrode group in an outer case 23 together with a positive electrode lead 21 and a negative electrode lead 22 and hermetically sealing it with a gasket 24, the electrode group including a positive electrode 11, a negative electrode 12, an ion permeable insulating layer 13 and an ion conductive polymer layer 14.

One end of the positive electrode lead 21 is connected to the positive electrode current collector 17, and the other end is drawn to the outside of the lithium ion battery 10 through an opening 25 of the outer case 23. One end of the negative electrode lead 22 is connected to the negative electrode current collector 19, and the other end is drawn to the outside of the lithium ion battery 10 through another opening 26 of the outer case 23.

As the positive electrode lead 21 and the negative electrode lead 22, any lead commonly used in the field pertinent to the present invention can be used. For example, an aluminum lead can be used as the positive electrode lead 21, and a nickel lead can be used as the negative electrode lead 22.

As the outer case 23, any outer case commonly used in the field pertinent to the present invention can be used, such as a case made of a metal material or a case made of a laminate film.

The two openings 25 and 26 of the outer case 23 are sealed with a gasket 24. The gaskets 24 can be made of, for example, various resin materials. It is also possible to directly seal the two openings 25 and 26 of the outer case 23 by fusion or the like, without using the gaskets 24.

A lithium ion battery 10 can be produced as follows, for example. First, one end of a positive electrode lead 21 is connected to a surface of a positive electrode current collector 17 of a positive electrode 11, the surface being opposite to the surface on which a positive electrode active material layer 18 is formed. Likewise, one end of a negative electrode lead 22 is connected to a surface of a negative electrode current collector 19 of a negative electrode 12, the surface being opposite to the surface on which a negative electrode active material layer 20 is formed. Next, the positive electrode 11 and the negative electrode 12 are brought together with an ion permeable insulating layer 13 as a separator interposed therebetween to produce an electrode group. At this time, the positive electrode 11 and the negative electrode 12 are disposed such that the positive electrode active material layer 18 and the negative electrode active material layer 20 face each other.

Then, the electrode group is inserted into an outer case 23 together with an electrolyte, and the other ends of the positive electrode lead 21 and the negative electrode lead 22 are drawn to the outside of the outer case 23. Next, each of openings 25 and 26 is sealed via a gasket 24 while the pressure in the outer case 23 is reduced to a vacuum to obtain a lithium ion battery 10.

The above embodiment has been described taking the flat battery shown in FIG. 1 as an example, but in the present invention, there is no particular limitation on the shape of the battery. For example, the lithium ion battery of the present invention may be a cylindrical or prismatic spirally wound design, or a stack design in which a plurality of positive and negative electrodes are laminated.

Next, the lithium ion battery of the present invention will be described taking other embodiments shown in FIGS. 2 to 5 as examples. FIGS. 2 to 5 are partially enlarged vertical cross-sectional views schematically showing lithium ion batteries according to other embodiments of the present invention. In the following description, the same parts (same names) as those of the lithium ion battery 10 shown in FIG. 1 are given the same reference numerals, and a description thereof is omitted here.

Figure 2:
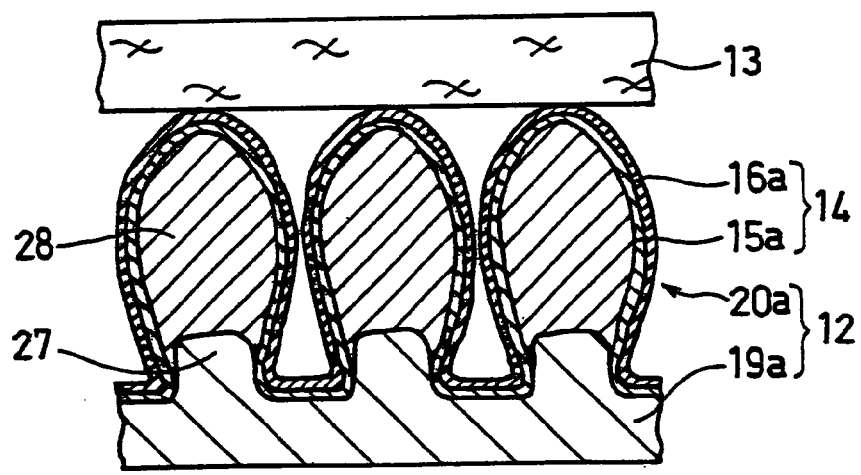
FIG. 2 is a partially enlarged vertical cross-sectional view schematically showing a lithium ion battery according to another embodiment of the present invention.

Referring to FIG. 2, this lithium ion battery includes an electrode group made up of a positive electrode, a negative electrode 12, an ion permeable insulating layer 13 interposed between the positive electrode and the negative electrode 12, and an ion conductive polymer layer 14 interposed between the negative electrode 12 and the ion permeable insulating layer 13.

In the lithium ion battery of FIG. 2 and those of FIGS. 3 to 5, which will be described later, as the structure of the positive electrode and the material for forming the positive electrode, those listed for the lithium ion battery of FIG. 1 can be used. In addition, illustration of positive electrodes is omitted in FIG. 2 and FIGS. 3 to 5, which will be described later.

The negative electrode 12 includes a negative electrode current collector 19*a* and a negative electrode active material layer 20*a* that is formed on the surface of the negative electrode current collector 19*a* and that contains an alloy-formable active material.

The negative electrode current collector 19a includes a plurality of protruding portions 27 on the surface thereof. The protruding portions 27 may be formed only on one surface of the negative electrode current collector 19a, or may be formed on both surfaces. The configuration of the negative electrode current collector 19a is the same as that of the negative electrode current collector 19 shown in FIG. 1, except for the plurality of protruding portions 27 formed on the surface.

The protruding portions 27 are protrusions extending outward from the surface of the negative electrode current collector 19a. The height of the protruding portions 27 is, but not limited to, for example, 1 to 15 µm, preferably 2 to 12 µm, and more preferably 3 to 10 µm, on average. The height of a protruding portion 27 is defined as the length of a perpendicular line extending from the extreme tip of the protruding portion 27 in the extension direction thereof to the surface of the negative electrode current collector 19a in a cross section cut along the thickness direction of the negative electrode current collector 19a. In addition, the average height of the protruding portions 27 is determined as, for example, an arithmetic average value of the heights of 100 protruding portions 27 measured by observing the cross section of the negative electrode current collector 19a with a scanning electron microscope (SEM).

The cross-sectional diameter of the protruding portions 27 is, but not limited to, for example, 1 to 50 µm, preferably 2 to 40 µm, and more preferably 3 to 30 µm, on average. The cross-sectional diameter of a protruding portion 27 is the width of the protruding portion 27 in a direction parallel to the surface of the negative electrode current collector 19a in a cross section cut along the thickness direction of the negative electrode current collector 19a. The average cross-sectional diameter of the protruding portions 27 is determined as, for example, an arithmetic average value of the widths of 100 protruding portions 27 measured by observing the cross section with a scanning electron microscope (SEM) as in the case of the average height of the protruding portions 27.

There is no particular limitation on the shape of the protruding portions 27, and examples include circular, polygonal, elliptical, parallelogram, trapezoidal and rhombus shapes as viewed from above in a direction vertical to the surface of the negative electrode current collector 19a. Also, there is no particular limitation on the number of protruding portions 27, the spacing between adjacent protruding portions 27 and the like, and they can be selected as appropriate according to the size (height, cross-sectional diameter or the like) of protruding portions 27, or the size of columnar bodies 28 provided on the surface of the protruding portions 27.

The negative electrode active material layer 20a is made up of an array of columnar bodies 28 that are formed on the surfaces of the protruding portions 27, and is a thin film as a whole. In the negative electrode active material layer 20a, adjacent columnar bodies 28 are spaced apart from each other. The columnar bodies 28 are formed so as to extend outward from the surface of the negative electrode current collector 19a. The columnar bodies 28 is also composed of an alloy-formable active material. A negative electrode active material layer that has columnar bodies on the surface can be obtained by forming (or depositing) a negative electrode active material layer on the surface of a negative electrode current collector that has protruding portions by a known method. The columnar bodies 28 may be formed by a known method as disclosed in, for example, Japanese Laid-Open Patent Publications Nos. 2007-280926 or 2008-218125.

The negative electrode active material layer 20a shown in FIG. 2 is an array of columnar bodies 28. The negative electrode active material layer 20 shown in FIG. 1 is what is called a solid film, which is uniformly formed on the surface of the negative electrode current collector 19, which means they have different shapes. However, as the alloy-formable active material that forms the negative electrode active material layer 20a of FIG. 2, any of the materials listed for the negative electrode active material layer 20 of FIG. 1 can be used.

In the lithium ion battery of FIG. 2, the ion conductive polymer layer 14 includes a first polymer layer 15a that is close to the negative electrode 12 (the negative electrode active material layer 20a) and a second polymer layer 16a that is close to the ion permeable insulating layer 13.

The first polymer layer 15a is configured to have higher adhesion properties to alloy-formable active material than the second polymer layer 16a, and the second polymer layer 16a is configured to have higher ion conductivity than the first polymer layer 15a.

Regarding the polymer layers 15a and 16a that form the ion conductive polymer layer 14, the function or effect obtained by differences in adhesion properties to alloy-formable active material and ion conductivity levels are the same as that of the ion conductive polymer layer 14 of FIG. 1.

In the lithium ion battery of FIG. 2, as described above, the negative electrode active material layer 20a is formed as an array of columnar bodies 28. With such a configuration, a portion with a columnar body 28 and a portion without a columnar body 28 are alternately formed on the surface of the negative electrode current collector 19a, and thereby giving the negative electrode active material layer 20a an irregularity. The gaps between columnar bodies 28 give a crack appearance.

Furthermore, the polymer layers 15a and 16a are fitted into the gap between a columnar body 28 and an adjacent columnar body 28, and extend to the surface of the negative electrode current collector 19a. In other words, the polymer layers 15a and 16a should be present between a columnar body 28 and an adjacent columnar body 28.

With the above configuration, the anchoring effect of the polymer layers 15a and 16a is exhibited, providing extremely good adhesion properties between the negative electrode active material layer 20a (each columnar body 28) and the ion conductive polymer layer 14. Accordingly, even if the alloy-formable active material repeatedly expands and contracts, the separation of the first polymer layer 15a (consequently, the ion conductive polymer layer 14) from the negative electrode active material layer 20a (each columnar body 28) can be suppressed reliably.

As the materials for forming the polymer layers 15a and 16a, any of the materials listed for the ion conductive polymer layer 14 of FIG. 1 can be used.

In the lithium ion battery of FIG. 2, in the case where the first polymer layer 15a and the second polymer layer 16a contain at least either one of PVDF and P(VdF-HFP), it is preferable to reduce the HFP unit content in the first polymer layer to a level lower than that of the second polymer layer as in the case of FIG. 1. The HFP unit content in each polymer layer and the quantitative relationship between two layers can be selected from the same ranges as those of FIG. 1.

The first polymer layer 15a and the second polymer layer 16a each can be formed in the same manner as the ion conductive polymer layer 14 (in other words, the first polymer layer 15 and the second polymer layer 16) of FIG. 1 is formed.

In order to cause the first polymer layer 15a and the second polymer layer 16a to effectively adhere to the surface of each columnar body 28, a polymer solution of low polymer concentration or low viscosity may be used to form the layers, thereby controlling the amount of polymer solution applied per unit area.

The polymer concentration of the polymer solution can be selected from the same range as that mentioned in FIG. 1, but the polymer concentration may be preferably 0.01 to 10 wt %, and more preferably 0.1 to 5 wt % (e.g., 0.2 to 4 wt %). The viscosity of the polymer solution may be adjusted by reducing the polymer concentration, or by selecting the type of solvent or a combination of solvents in which the polymer is dissolved or dispersed.

Figure 3:
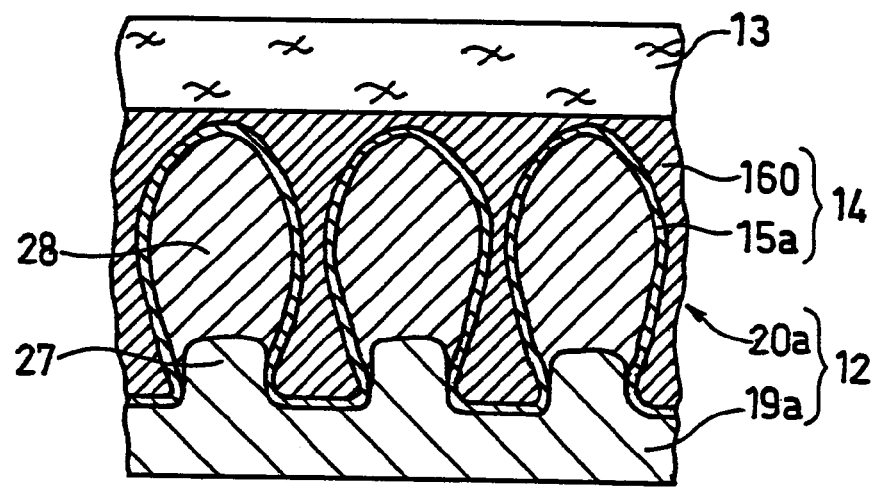
FIG. 3 is a partially enlarged vertical cross-sectional view showing an example of a modified version of FIG. 2.

An embodiment shown in FIG. 3 is an example of a modified version of the embodiment shown in FIG. 2.

Referring to FIG. 3, the ion conductive polymer layer 14 of this lithium ion battery includes a first polymer layer 15a formed adhering to the surface of each columnar body 28 and a second polymer layer 160 formed adhering to the surface of the first polymer layer 15a.

The first polymer layer 15a is fitted into the gap between a columnar body 28 and an adjacent columnar body 28, and adheres to the surface of each columnar body 28. The first polymer layer 15a can be formed in the same manner as described in the lithium ion battery shown in FIG. 2.

The second polymer layer 160 is also fitted into the gap between a columnar body 28 and an adjacent columnar body 28, and adheres to the surface of the first polymer layer 15a. To form the second polymer layer 160, a polymer solution of low polymer concentration or low viscosity may be used as in the case of FIG. 2.

In the lithium ion battery of FIG. 3, each gap between columnar bodies 28 is filled with the second polymer layer 160. To form such a second polymer layer 160, the same polymer solutions as those used to form the second polymer layer 16a of FIG. 2 can be used.

Figure 4:
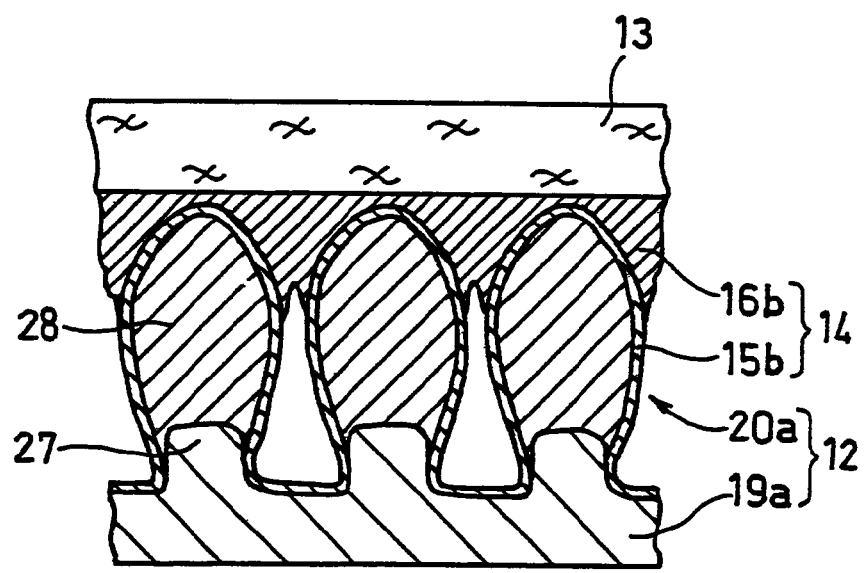
FIG. 4 is a partially enlarged vertical cross-sectional view showing another example of a modified version of FIG. 2.

An embodiment shown in FIG. 4 is an example of a modified version of the embodiment shown in FIG. 2.

Referring to FIG. 4, the ion conductive polymer layer 14 of this lithium ion battery includes a first polymer layer 15b formed adhering to part of the surface of each columnar body 28 and a second polymer layer 16b formed adhering to the surface of the first polymer layer 15b.

The first polymer layer 15b is fitted into the gap between a columnar body 28 and an adjacent columnar body 28, and adheres to the surface of the negative electrode current collector 19a. The first polymer layer 15b can be formed in the same manner as described in the lithium ion battery shown in FIG. 2.

The second polymer layer 16b is not sufficiently fitted into the gap between a columnar body 28 and an adjacent columnar body 28, and is not in contact with the first polymer layer 15b in the vicinity of the negative electrode current collector 19a. Such a second polymer layer 16b can be formed using a polymer solution of high polymer concentration or high viscosity. The second polymer layer 16b may also be formed by using a polymer solution in which a solvent that does not volatilize in a drying step (a non- or low-volatile solvent) is mixed, or by adjusting the removal of solvents in a drying step.

The polymer concentration of the polymer solution may be selected from the same range as that mentioned in FIG. 1, but the polymer concentration may be preferably 1 to 20 wt %, and more preferably 3 to 15 wt %, e.g., 5 to 12 wt %.

An embodiment shown in FIG. 5 is an example of a modified version of the embodiment shown in FIG. 2.

Referring to FIG. 5, the ion conductive polymer layer 14 of this lithium ion battery includes a first polymer layer 15c formed adhering to part of the surface of each columnar body 28 and a second polymer layer 16c formed adhering to the surface of the first polymer layer 15c.

The first polymer layer 15c is not sufficiently fitted into the gap between a columnar body 28 and an adjacent columnar body 28. The first polymer layer 15c adheres to part of the ion permeable insulating layer 13-side surface of columnar bodies 28, but it does not extend to the surface of the negative electrode current collector 19a. Such a first polymer layer 15c can be formed by selecting the polymer concentration or the viscosity of the polymer solution, the type of solvent, or the degree of removal of solvents in a drying step as appropriate as in the case of the example of FIG. 4.

On the other hand, the second polymer layer 16c adheres to the surface of the first polymer layer 15c. There is no particular limitation on the polymer solution used to form the first polymer layer 15c, the polymer concentration, the viscosity, the type of solvent and the like can be set as appropriate, and they may be the same as those of the example of FIG. 1.

In the lithium ion battery of the present invention, the ion conductive polymer layer that is formed between the negative electrode and the ion permeable insulating layer is configured to include a negative electrode-side portion and an ion permeable insulating layer-side portion that have different compositions, and the ion permeable insulating layer-side portion is configured to have higher ion conductivity than the negative electrode-side portion.

With such a configuration, it is possible to secure adhesion properties between the ion conductive polymer layer and the negative electrode active material layer while securing high ion conductivity. Accordingly, even if cracks occurs in the negative electrode active material layer due to repeated expansion and contraction of the alloy-formable active material, it is possible to suppress the contact between the fresh surfaces created on the negative electrode active material layer and the electrolyte solution, as well as side reactions caused by such contact. Furthermore, the deformation of the electrode, a reduction in the cycle life and the consumption of the electrolyte solution can be suppressed, and the charge/discharge cycle characteristics of the battery can be improved. In addition, because the ion conductive polymer layer has high ion conductivity, the increase of the resistance against ionic conduction can be suppressed, as a result of which the rate characteristics of the battery can be maintained.

The ion conductive polymer layer needs to have both adhesion properties to the negative electrode active material layer and high ion conductivity. For example, in the ion conductive polymer layer, the ion permeable insulating layer-side portion has higher ion conductivity than that of the negative electrode-side portion. The ion conductivity level of the ion permeable insulating layer-side portion measured by an alternating current impedance method can be, for example, 0.05 mS/cm or more (e.g., 0.05 to 0.2 mS/cm), preferably 0.07 to 0.17 mS/cm, and more preferably 0.1 to 0.16 mS/cm. The ion conductivity level can be measured by using a sample obtained by impregnating an ion permeable insulating layer-side portion of the ion conductive polymer layer with an electrolyte solution in which $LiPF_6$ ($LiPF_6$ concentration: 1.2 mol/L) is dissolved in ethylene carbonate/dimethyl carbonate (volume ratio: 2/8).

The adhesion strength between the ion conductive polymer layer and the negative electrode active material layer is, for example, in terms of a laminate (sample) in which the negative electrode current collector, the negative electrode active material layer and the ion conductive polymer layer are laminated in this order, for example, 100 to 300 $N/cm^2$, preferably 150 to 260 $N/cm^2$, and more preferably 170 to 250 $N/cm^2$.

The adhesion strength is obtained by, for example, a tack test using a laminate sample as mentioned above that had been pressed under conditions of 80° C. and 5 kgf/cm² (4.9 MPa). The tack test is performed under the conditions of, for example, a pressing speed of 30 mm/min, a pressing time of 10 seconds, a load of 400 gf (3.92 N) and a peeling speed of 600 mm/min. The test results thus obtained are almost the same as the adhesion strength of the actual negative electrode.

The lithium ion battery of the present invention is not limited to the above embodiments, and the lithium ion battery of the present invention may be, for example, a spirally wound design in which a positive electrode and a negative electrode are spirally wound with a separator interposed therebetween. In other words, the lithium ion battery of the present invention can take various forms such as a flat battery including a laminated electrode group, a cylindrical battery including a spirally wound electrode group, and a prismatic battery including a spirally wound electrode group.

The lithium ion battery of the present invention can be used for the same applications as those of conventional lithium ion batteries, and in particular is suitable for use as a power source for portable electronic devices (compact portable electronic devices in particular) such as personal computers, cellular phones, mobile devices, portable information terminals and portable game consoles. The lithium ion battery of the present invention is also capable of coping with an increased power consumption of multifunction electronic devices, and is applicable as an automotive power source, an uninterruptible power supply, and the like.

EXAMPLE

Hereinafter, the present invention will be described in further detail with reference to examples, comparative examples and test examples.

Example 1

(1) Production of Positive Electrode Active Material

Cobalt sulfate was added to an aqueous solution of nickel sulfate in a Ni-to-Co molar ratio of 8.5:1.5 to prepare an aqueous solution having a metal ion concentration of 2 mol/L. An aqueous solution of 2 mol/L sodium hydroxide was slowly dripped to the obtained aqueous solution while stirring for neutralization, and a precipitate was obtained. The resultant precipitate was separated through filtration, washed with water and dried at 80° C. to obtain a composite hydroxide represented by a formula: $Ni_{0.85}Co_{0.15}(OH)_2$. Then, the composite hydroxide was heated in the air at 900° C. for 10 hours, and through the heat treatment, a composite oxide represented by a formula: $Ni_{0.85}Co_{0.15}O$ was obtained.

Next, a lithium hydroxide monohydrate was added so that the sum of the numbers of Ni and Co atoms in the composite oxide was equal to the number of Li atoms, and the composite oxide was heated in the air at 800° C. for 10 hours to obtain a lithium nickel-containing composite oxide represented by a formula: $LiNi_{0.85}Co_{0.15}O_2$ (positive electrode active material). The lithium nickel-containing composite oxide had an average secondary particle size of 10 μm.

(2) Production of Positive Electrode

A positive electrode material mixture paste was obtained by sufficiently mixing 93 g of the above lithium nickel-containing composite oxide (positive electrode active material) in the form of powders, and 3 g of acetylene black (conductive material), 4 g of polyvinylidene fluoride powder (binder), and 50 mL of N-methyl-2-pyrrolidone (solvent). Then, the obtained positive electrode material mixture paste was applied onto one surface of an aluminum foil (thickness: 15 μm) serving as a positive electrode current collector, dried and rolled. In this manner, a positive electrode that had a total thickness of 71 μm and that included a positive electrode active material layer on one surface was obtained.

Then, the obtained positive electrode was cut such that the positive electrode active material layer had a 20 mm×20 mm square shape. And, a region (5 mm long and 5 mm wide) where the positive electrode current collector was exposed was provided so as to protrude from one of the sides of the positive electrode active material layer for use as a lead attachment portion.

(3) Production of Negative Electrode

Production of Negative Electrode Current Collector

Production of a negative electrode current collector will be described with reference to FIGS. 6A, 6B, and 7.

First, a roughening process was performed on one surface of a 27 μm thick copper foil (product number: HCL-02Z, available from Hitachi Cable, Ltd.) by electroplating so as to obtain a copper foil 31 used as a negative electrode current collector. After the roughening process, rough particles (copper particles) having a particle size of about 1 μm were present on a processed surface 32 of the negative electrode current collector copper foil 31. The processed surface 32 of the negative electrode current collector copper foil 31 had a surface roughness of 1.5 μm (ten-point average roughness Rz according to the annexed document 1 (reference) of JIS B $0601_{:2001}$).

On the other hand, a plurality of recesses (grooves) were formed on the outer surface of a ceramic roll by laser engraving to obtain a work roll 33 used for rolling process. The plurality of recesses formed on the outer surface of the work roll 33 all had a rhombus shape as viewed from a direction normal to the work roll 33. In the rhombus shape, the short diagonal line had a length of 10 μm and the long diagonal line had a length of 20 μm. The spacing between adjacent recesses along the short diagonal line was 18 μm, and the spacing between adjacent recesses along the long diagonal line was 20 μm. Each recess had a depth of 10 μm.

Figure 6A:
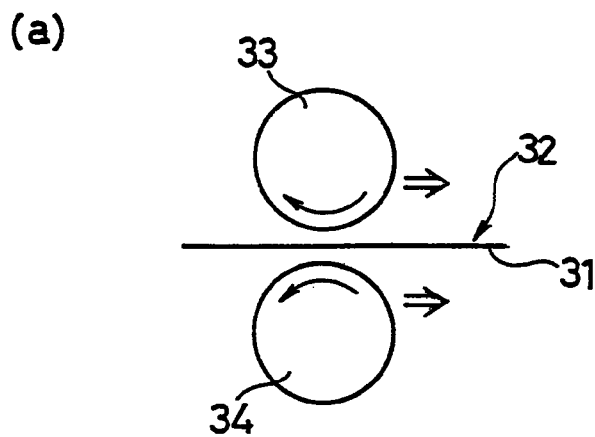
FIG. 6A is a conceptual diagram showing a process for producing negative electrode current collectors.
Figure 6B:
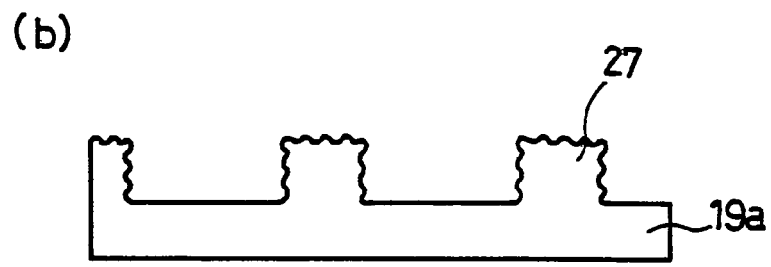
FIG. 6B is a plan view schematically showing an example of protruding portions 27 on the surface of a negative electrode current collector 19.

Next, as shown in FIG. 6A, with respect to the negative electrode current collector copper foil 31, the work roll 33 was placed so as to face the processed surface 32 of the negative electrode current collector copper foil 31, and another ceramic roll 34 was placed so as to face the surface opposite to the processed surface 32. Then, a rolling process was performed by causing the negative electrode current collector copper foil 31 to pass through between the work roll 33 and the other roll 34 while applying a linear pressure of 1 t/cm.

In this manner, a negative electrode current collector 19a having a plurality of protruding portions 27 on the surface as shown in FIGS. 2 to 5 was obtained. In the processed surface 32 of the negative electrode current collector copper foil 31, a region that was pressed by the outer surface (excluding the inner surface of the recesses) of the work roll 33 when passing through between the pair of rolls 33 and 34 was flattened. On the other hand, part of the negative electrode current collector copper foil 31 had fitted into the recesses of the work roll 33 to form protruding portions 27. The surface of the protruding portions 27 was not flattened. The protruding portions 27 had a height of about 6 μm, which was smaller than the depth of the recesses of the work roll 33.

Figure 7:
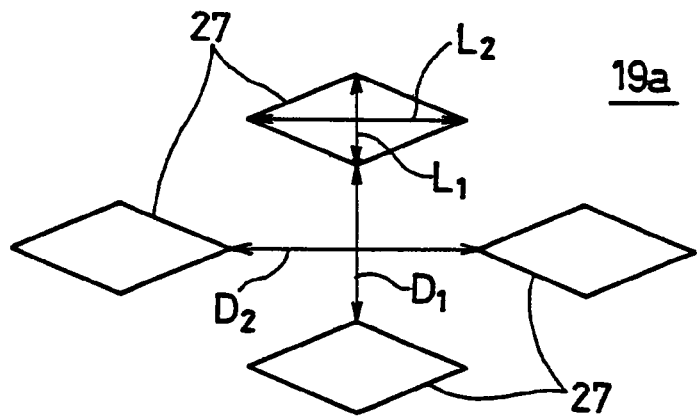
FIG. 7 is a partially enlarged plan view of a negative electrode current collector.

FIG. 7 is a plan view of the negative electrode current collectors 19a shown in FIGS. 2 to 5. The shape and arrangement of the protruding portions 27 correspond to those of the recesses of the work roll 33. The top of each protruding portion 27 had a substantially rhombus shape as viewed from above, and the short diagonal line had a length $L_1$ of about 10 μm and the long diagonal line had a length $L_2$ of about 20 μm. The spacing $D_1$ between adjacent protruding portions 27 along the short diagonal line was 18 μm, and the spacing $D_2$ between adjacent protruding portions 27 along the long diagonal line was 20 μm.

Formation of Negative Electrode Active Material Layer

Figure 8:
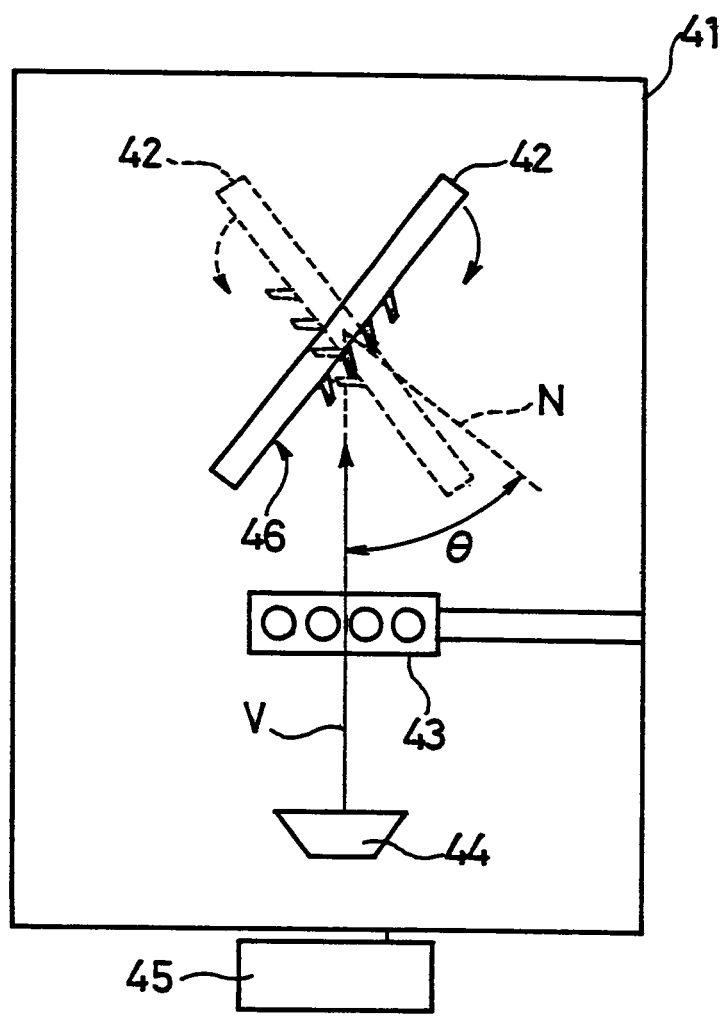
FIG. 8 is a front view schematically showing a vapor deposition apparatus for producing negative electrodes.

The thus-obtained negative electrode current collector 19a was placed on a holder 42 within a vacuum chamber 41 shown in FIG. 8. Then, electron beam (EB) deposition using a deposition unit (a unit including an evaporation source, a crucible 44 and an electron beam generator 45) and silicon as an evaporation source was performed while supplying an oxygen gas having a purity of 99.7% to the vacuum chamber 41 through a nozzle 43. The vacuum chamber 41 during EB deposition had an oxygen atmosphere with a pressure of 3.5 Pa. The electron beam generated by the electron beam generator 45 was deflected by a deflection yoke toward the evaporation source for irradiation. As the evaporation source, scrap silicon (purity: 99.999%) was used.

In the deposition process, the holder 42 was inclined such that the inclined angle (deposition angle) θ of deposition direction V with respect to a direction N normal to a deposition surface 46 (a surface of the negative electrode current collector 19a on which protruding portions 27 had been formed) was +70°. A first deposition step was performed in this state, and a first tier (first portion) constituting columnar bodies 28 (see FIGS. 2 to 5) was formed on the protruding portions 27. In the first deposition step, the film forming speed was set to about 8 nm/s, and the amount of oxygen flow was set to 5 sccm (the amount (cc) of flow per minute in the standard state (at 25° C., 1 atm)). The height of the first portion was adjusted to 0.4 μm.

Subsequently, the holder 42 was rotated about the central axis in a clockwise direction viewed from the front direction in FIG. 8 so that the holder 42 was inclined in a direction opposite to the inclined direction of the holder 42 in the first deposition step. The deposition angle θ was set to −70°, and a second deposition step was performed to form a second portion.

Then, third to thirty fifth deposition steps were consecutively performed, and columnar bodies 28 having a height of 14 μm (see FIGS. 2 to 5) were obtained.

Of the third to thirty fifth deposition steps, in the steps with odd numbers, the holder 42 was inclined in the same direction as that used in the first deposition step to have a deposition angle θ of +70°. On the other hand, in the steps with even numbers, the holder 42 was inclined in the same direction as that used in the second deposition step to have a deposition angle of −70°.

The molar ratio x of amount of oxygen to that of silicon in $SiO_x$ forming the finally obtained columnar bodies 28, and was 0.4 on average.

The thus-obtained negative electrode active material layer 20 (columnar bodies 28) were subjected to lithium deposition. The amount of deposition was set to an amount equivalent to the irreversible capacity of negative electrode, which was set to a thickness of 9 μm when formed as a solid film.

Then, the obtained negative electrode was cut such that the negative electrode active material layer had a 21 mm×21 mm square shape. Also, a region (5 mm long and 5 mm wide) where the negative electrode current collector was exposed was provided so as to protrude from one of the sides of the negative electrode active material layer for use as a lead attachment portion.

(4) Formation of Ion Conductive Polymer Layer

A polymer solution in which P(VdF-HFP) or PVdF had been dissolved in a solvent at a specified concentration listed in Table 1 was applied onto the negative electrode active material layer of the negative electrode and dried to form an ion conductive polymer layer. As the solvent used in the polymer solutions, N-methyl-2-pyrrolidone (NMP) or dimethyl carbonate (DMC) was selected according to the polymer material. Application was performed by dip coating in which the negative electrode was immersed in a polymer solution heated to 70° C.

The drying step was performed as follows according to the kinds of solvent used in the polymer solutions. When NMP was used as a solvent, vacuum drying was performed at 85° C. for 10 minutes. When DMC was used as a solvent, natural-air drying was performed for 5 minutes, and thereafter drying at 80° C. was performed for 5 minutes.

Table 1 shows the HFP content (wt %) of P(VdF-HFP), the polymer concentration (wt %) and the kinds of solvent of the polymer solutions used to form the first and second polymer layers. Zero weight percent written in the HFP content column indicates that PVdF was used as a polymer.

TABLE 1

|  | Negative electrode-side polymer layer | | | Insulating layer-side polymer layer | | |
|---|---|---|---|---|---|---|
|  | HFP Content [wt %] | Polymer Concentration [wt %] | Solvent | HFP Content [wt %] | Polymer Concentration [wt %] | Solvent |
| Ex. 1 | 0 | 2 | NMP | 15 | 3 | DMC |
| Ex. 2 | 0 | 2 | NMP | 12 | 3 | DMC |
| Ex. 3 | 3 | 2 | NMP | 15 | 3 | DMC |
| Ex. 4 | 3 | 2 | NMP | 12 | 3 | DMC |
| Comp. Ex. 1 | 0 | 4 | NMP | — | — | — |
| Comp. Ex. 2 | 15 | 4 | DMC | — | — | — |

The thickness of each of the formed polymer layers was determined by subjecting the obtained negative electrode to a cross section polisher to create a cross section, and observing the cross section with a scanning electron microscope (SEM).

(5) Production of Laminated Battery

The positive electrode obtained in (2) described above and the negative electrode obtained in (4) described above in which an ion conductive polymer layer had been formed on the surface were laminated with a polyethylene microporous film (separator, trade name: Hipore, thickness: 20 μm, available from Asahi Kasei Corporation) interposed therebetween as an ion permeable insulating layer so as to produce an electrode group.

Next, one end of an aluminum positive electrode lead having a polypropylene tab formed thereon was welded to the lead attachment portion of the positive electrode. Likewise, one end of a nickel negative electrode lead having a polypropylene tab formed thereon was welded to the lead attachment portion of the negative electrode. The obtained electrode group was inserted in an outer case made of an aluminum laminate sheet. Next, the positive electrode lead and the negative electrode lead were drawn to the outside through the openings of the outer case such that each tab would serve as a fusing portion, and the openings of the outer case was fused together with the propyrene tabs. Then, an electrolyte solution was injected from another opening of the outer case, and the opening was vacuum-sealed to obtain the intended battery.

As the electrolyte solution, a non-aqueous electrolyte solution prepared by dissolving $LiPF_6$ at a concentration of 1.2 mol/L in a solvent mixture containing ethylene carbonate and ethyl methyl carbonate at a volume ratio of 1:4 was used.

The thus-obtained battery was heat-pressed under a pressure of 5 kgf/cm$^2$ (4.9 MPa) at 80° C. for 5 minutes.

The electrodes and lithium ion batteries obtained in the examples were subjected to the following evaluation tests.

(a) Evaluation of Adhesion Properties Between Ion Conductive Polymer Layer and Alloy-Formable Active Material The peel strength between negative electrode active material layer and ion conductive polymer layer was measured using a tack tester (product number: TAC-II available from Rhesca Corporation), and the adhesion properties between ion conductive polymer layer and alloy-formable active material were evaluated based on the results of measurement.

A sample for adhesion strength measurement was obtained by cutting each negative electrode to a size 2 cm long and 3 cm wide. The negative electrode active material layer of the sample was impregnated with the above electrolyte solution, and excess electrolyte solution was wiped off. Then, the negative electrode was heat-pressed under conditions of 80° C. and 5 kgf/cm$^2$ (4.9 MPa).

Next, a piece of double adhesive tape (No. 515 available from Nitto Denko Corporation) was attached onto the tip (diameter: 2 mm) of a probe of the tack tester, and the sample for adhesion strength measurement was set such that the surface of the sample and the probe faced each other. A peel test was performed in which the probe was pressed against the sample under the following conditions, and then withdrawn to measure a maximum load at which separation occurred. The obtained adhesion strengths (kgf/cm$^2$ (×9.8 N/cm$^2$)) are shown in Table 2.

Pressing Speed: 30 mm/min
Pressing Time: 10 seconds
Load: 400 gf (3.92 N)
Peeling Speed: 600 mm/min (b) Evaluation of Ion Conductivity of Ion Conductive Polymer Layer The ion conductivity of ion conductive polymer layer was evaluated as follows.

The polymer solution used in the examples was cast onto a glass substrate, and dried in the same manner as in the examples. The obtained polymer film was impregnated with an electrolyte solution in which $LiPF_6$ ($LiPF_6$ concentration: 1.2 mol/L) was dissolved in ethylene carbonate/dimethyl carbonate (volume ratio: 2/8) to prepare a sample. The thus-obtained sample was interposed between gold electrodes, and the ion conductivity level was measured by an alternating current impedance method.

The results of the adhesion evaluation and the conductivity evaluation are shown in Table 2.

TABLE 2

|  | Negative electrode-side polymer layer | | | Insulating layer-side polymer layer | |
| --- | --- | --- | --- | --- | --- |
|  | Adhesion properties [kgf/cm$^2$] | Ion Conductivity [mS/cm] | Thickness [μm] | Ion Conductivity [mS/cm] | Thickness [μm] |
| Ex. 1 | 20 | 0.026 | 0.8 | 0.145 | 2.5 |
| Ex. 2 | 20 | 0.026 | 0.1 | 0.107 | 2.0 |
| Ex. 3 | 18 | 0.050 | 0.8 | 0.145 | 2.5 |
| Ex. 4 | 18 | 0.050 | 0.1 | 0.107 | 2.0 |
| Comp. Ex. 1 | 20 | 0.026 | 3.0 | — | — |
| Comp. Ex. 2 | 10 | 0.145 | 4.0 | — | — |

The obtained negative electrodes exhibited good adhesion properties between negative electrode active material layer and ion conductive polymer layer, except for Comparative Example 2.

(c) Evaluation of Rate Characteristics

A charge/discharge cycle comprising the following constant current constant voltage charge and the following constant current discharge was repeated three times. Interval of 20 minutes was taken between the charge and discharge. Then, the lithium ion battery was charged under the same conditions as the following constant current constant voltage charge.

Constant Current Constant Voltage Charge:

Charge was performed at a constant current of 0.2 C to end-of-charge voltage of 4.2 V, then at a constant voltage of 4.2 V to end-of charge current of 0.05 C.

Constant Current Discharge:

Discharge was performed at a constant current 0.2 C to end-of-discharge voltage of 2.5 V.

Then, in order to check the output characteristics of the lithium ion battery, 1 C rate discharge was performed, and the ratio of capacity at 1 C to capacity at 0.2 C was determined in percentage, which was defined as "rate characteristics": [(capacity at 1 C/capacity at 0.2 C)×100].

(d) Evaluation of Charge/Discharge Cycle Characteristics

In an environment of 20° C., charge was performed at a constant current of 1 C to 4.2 V and then at a constant voltage of 4.2 V to an end-of-charge current of 0.05 C. Discharge was performed at 1 C to 2.5 V. This charge/discharge cycle was repeated 100 times, and the average of coulomb efficiency values of the cycles was determined.

(Coulomb efficiency)=(Discharge capacity)/(Charge capacity)×100[%].

TABLE 3

|  | Rate Characteristics [%] | Coulomb Efficiency [%] |
| --- | --- | --- |
| Ex. 1 | 92 | 99.8 |
| Ex. 2 | 92 | 99.6 |
| Ex. 3 | 94 | 99.4 |
| Ex. 4 | 93 | 99.4 |
| Comp. Ex. 1 | 80 | — |
| Comp. Ex. 2 | 94 | 99.0 |

As can be clearly seen from Table 3, Comparative Example 1 in which an ion conductive polymer layer made of PVDF was formed exhibited lower rate characteristics than other samples. The comparison in terms of the average coulomb efficiency value of 100 cycles indicates that all of the samples subjected to the cycle test exhibited a good coulomb efficiency value of 99% or more, and the samples of Examples 1 to 4 exhibited much better characteristics than Comparative Example 2.

The lithium ion battery of the present invention has the same applications as those of conventional lithium ion batteries, and is useful as a power source for portable electronic devices, in particular, personal computers, cellular phones, mobile devices, personal digital assistants (PDAs), portable game consoles and video cameras. The lithium ion battery of the present invention is also expected to be used as a secondary battery that assists electric motors in hybrid electric vehicles, fuel cell vehicles and so on, as a power source for driving power tools, cleaning machines and robots, as a power source for plug-in HEVs, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion battery comprising:
a positive electrode including a positive electrode current collector and a positive electrode active material layer that contains a positive electrode active material capable of absorbing and desorbing lithium;
a negative electrode including a negative electrode current collector and a negative electrode active material layer that contains an alloy-formable active material;
an ion permeable insulating layer that is interposed between said positive electrode and said negative electrode; and
an ion conductive polymer layer that is interposed between said negative electrode and said ion permeable insulating layer,
wherein said ion conductive polymer layer includes a negative electrode-side portion and an ion permeable insulating layer-side portion that have different compositions, and said ion permeable insulating layer-side portion has higher ion conductivity than said negative electrode-side portion.

2. The lithium ion battery in accordance with claim 1, wherein said ion permeable insulating layer-side portion has an ion conductivity level of 0.05 mS/cm or more when measured by an alternating current impedance method.

3. The lithium ion battery in accordance with claim 1, wherein the adhesion strength between said negative electrode active material layer and said ion conductive polymer layer is 100 to 300 N/cm$^2$.

4. The lithium ion battery in accordance with claim 1, wherein:
said ion conductive polymer layer is a laminate including a first polymer layer that adheres to said alloy-formable active material and a second polymer layer that is in contact with said ion permeable insulating layer, and
said second polymer layer has higher ion conductivity than said first polymer layer.

5. The lithium ion battery in accordance with claim 4, wherein the ratio $T_N/T_I$ of thickness $T_N$ of said first polymer layer to thickness $T_I$ of said second polymer layer is 0.01 to 10.

6. The lithium ion battery in accordance with claim 4, wherein each layer forming said laminate contains at least one polymer selected from the group consisting of polyvinylidene fluoride and a copolymer of vinylidene fluoride and hexafluoropropylene.

7. The lithium ion battery in accordance with claim 4, wherein said first and second polymer layers contain a copolymer of vinylidene fluoride and hexafluoropropylene, and said first polymer layer has a smaller hexafluoropropylene unit content in the copolymer than said second polymer layer.

8. The lithium ion battery in accordance with claim 7, wherein said first polymer layer has a hexafluoropropylene unit content $R_N$ in the copolymer of 0.1 to 15 wt %, and the difference $R_I-R_N$ between $R_N$ and a hexafluoropropylene unit content $R_I$ in the copolymer of said second polymer layer is 0.1 to 25 wt %.

9. The lithium ion battery in accordance with claim 1, wherein said ion conductive polymer layer contains an inorganic filler.

10. The lithium ion battery in accordance with claim 1, wherein said ion conductive polymer layer has a thickness of 0.01 to 20 µm.

11. The lithium ion battery in accordance with claim 1, wherein said negative electrode active material layer is a film formed by a vapor deposition method.

12. The lithium ion battery in accordance with claim 1, wherein said negative electrode active material layer extends outward from the surface of said negative electrode current collector, and is an array of a plurality of columnar bodies that are spaced apart from each other.

13. The lithium ion battery in accordance with claim 1, wherein said alloy-formable active material is at least one selected from an alloy-formable active material that contains silicon and an alloy-formable active material that contains tin.

* * * * *